March 7, 1950 W. B. WIEGAND ET AL 2,499,437
APPARATUS FOR MANUFACTURE OF CARBON BLACK
Filed Sept. 12, 1944 2 Sheets-Sheet 2
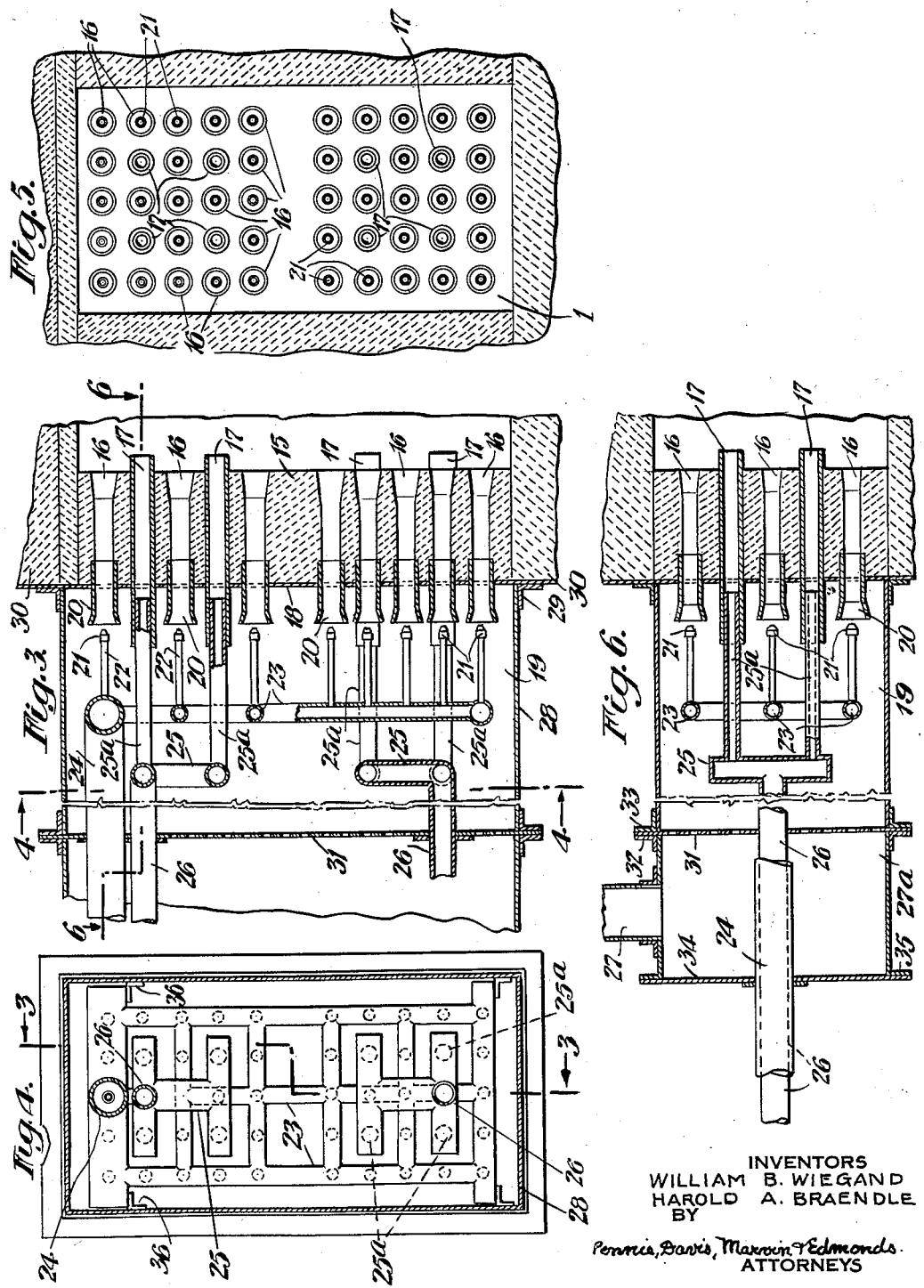
INVENTORS
WILLIAM B. WIEGAND
HAROLD A. BRAENDLE
BY
Pennie, Davis, Marvin & Edmonds
ATTORNEYS Patented Mar. 7, 1950

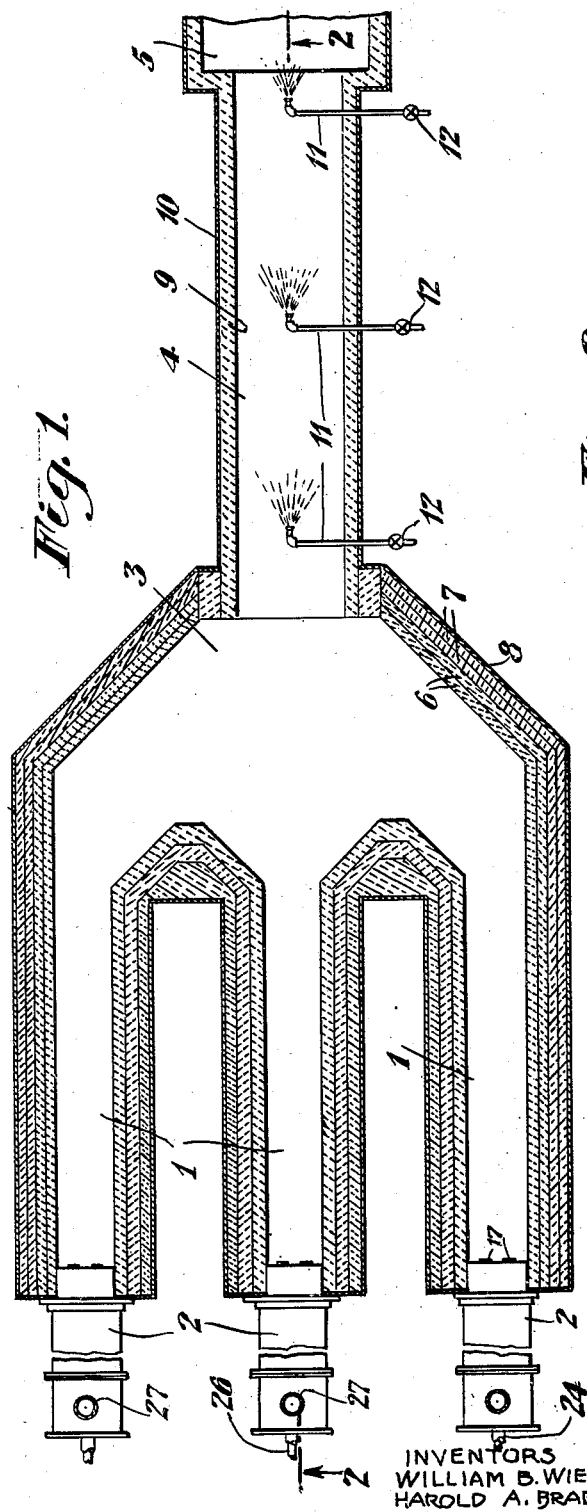
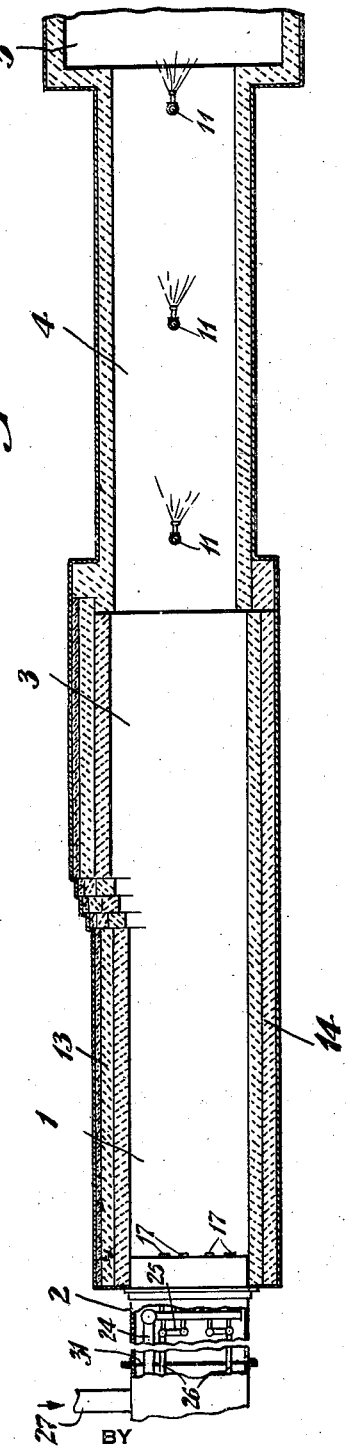

2,499,437

UNITED STATES PATENT OFFICE 2,499,437

APPARATUS FOR MANUFACTURE OF CARBON BLACK

William B. Wiegand, Old Greenwich, Conn., and Harold A. Braendle, Garden City, N. Y., assignors to Columbian Carbon Company, New York, N. Y., a corporation of Delaware Application September 12, 1944, Serial No. 553,780

6 Claims. (Cl. 23—259.5)

This invention relates to the manufacture of carbon black, and more particularly to an improved apparatus especially adapted for use in carrying out a novel process for the manufacture of carbon black, described in our copending application Serial No. 553,781, filed September 12, 1944.

The utility of the apparatus of our present invention is, however, not restricted to the particular operating conditions described in said application. An advantage of the apparatus of our present invention is its flexibility with respect to the range of its operating conditions and the character of the carbon black, which may be produced therein by varying such conditions.

According to the process described in our said co-pending application, a hydrocarbon gas, therein referred to as make gas, is injected at high velocity into highly turbulent blast flame gases, being blasted at high velocity into one end of an unobstructed, elongated reaction chamber, each being injected into the chamber in a direction substantially parallel to the longitudinal axis thereof. The flow of the resultant mixture of flame gases and make gas is continued through the unobstructed reaction chamber at a high velocity and in a high state of turbulence, and at a temperature such that, during its passage therethrough, the make gas is decomposed by the heat of combustion to form carbon particles in suspension in the gaseous stream. The mixture of gases and suspended carbon is maintained at an elevated temperature for a prescribed period of time and is thereafter cooled and the carbon separated and collected by conventional means. Our improved apparatus will be specifically described and illustrated herein with reference to an operation of the type therein described but, as previously noted, it will be understood that the utility of the apparatus is not so limited.

In general, the apparatus of our present invention comprises an elongated, unobstructed reaction chamber, provided at one end with a burner block through which passes one or more make gas injection tubes, flanked on each side by burner ports. The apparatus is provided with means for blasting a combustible gaseous mixture, for instance a mixture of fuel gas and air through the burner ports at high velocity in a direction substantially parallel to the longitudinal axis of the reaction chamber, the make gas injection tubes also extending substantially parallel to the longitudinal axis of the chamber.

The transverse sectional area of the reaction chamber is so proportioned with respect to the number and size of the make gas injection tubes and of the burner ports, as to cause the gaseous mixture to pass through the reaction chamber at a velocity such as will produce the required state of turbulence, when the make gas and combustible blast gas mixture are supplied under the prescribed conditions. The length of the reaction chamber is so proportioned with respect to the velocity of the gases passing therethrough, as to provide the necessary time factor for the reaction. Thus, the size and proportions of the various elements of the apparatus are subject to considerable variation, depending upon the capacity of the apparatus and other operating conditions, as hereinafter described.

The apparatus of our present invention will be more fully described and illustrated by reference to the accompanying drawings, which represent a practical, commercial sized embodiment thereof. It will be understood, however, that the invention is not limited to the particular arrangement and proportions of the elements there shown.

Fig. 1 of the accompanying drawings is a horizontal sectional view of the apparatus;

Fig. 2 is a vertical, longitudinal view along the line 2—2;

Fig. 3 is an enlarged longitudinal sectional view of the burner assembly along the broken line 3—3 of Fig. 4;

Fig. 4 is an enlarged transverse sectional view of the burner assembly along the line 4—4 of Fig. 3;

Fig. 5 is an end view of the burner assembly shown in Fig. 3; and

Fig. 6 is a horizontal sectional view of Fig. 3 along line 6—6.

The apparatus specifically illustrated in the drawings comprises three reaction chambers combined in a single unit. However, it will be understood that where desirable, entirely separate and independent reaction chambers may be employed. Further, it is not essential that the reaction chambers be of rectangular cross-section, as shown in the drawings. Reaction chambers of cylindrical shape, for instance, may be employed.

With particular reference to Figs. 1 and 2 of the drawings, three parallel reaction chambers 1, of rectangular cross section, are shown. Burner and make gas injection assemblies 2 are secured to the entrance end of the respective reaction chambers. At their exit ends, the reaction chambers communicate with a so-called, blending chamber 3. The effluent from chamber 3 passes to and through the flume 4 and thence to a pre-cooler indicated at 5. The chambers 1 and 3 are lined with fire brick and are well insulated against loss of heat. More specifically the outer vertical walls of the outer reaction chambers 1 and of the blending chamber 3 are constructed of two 4½ inch thicknesses of fire brick 6 covered by two 4½ inch thicknesses of heat insulating material 7, all enclosed in a sheet metal casing 8. The inner vertical walls of the two outer reaction chambers 1 and both vertical walls of the inner reaction chamber 1 are similarly constructed except for the omission of one of the layers of insulation.

The flume 4 is of cylindrical cross-section and is constructed of a single thickness of fire brick 9, 4½ inches in thickness enclosed in a sheet metal casing 10, and is otherwise uninsulated against loss of heat. The pre-cooler diagrammatically represented at 5, may be of any conventional design and leads to conventional cooling and collecting equipment, not shown in the drawings.

The flume 4 is equipped with a series of water sprays conveniently spaced along the length of the flume, as indicated at 11. These water sprays are connected in conventional manner with a suitable source of water, the connections being provided with separate control valves as indicated at 12. The water sprays should be so positioned and used in such a way as to provide effective control of the time factor, and adequate flexibility to meet varied operating conditions as hereinafter more fully described.

The roof 13 and floor 14 of the chambers 1 and 3 are constructed of 12 inch thicknesses of fire brick. The roof is suspended in a conventional manner and is covered with a 1" thickness of heat insulating material surmounted by a sheet metal casing.

The burner assemblies 2, as more clearly shown in Figs. 3 to 6, inclusive, of the drawings comprise a refractory burner block 15 adapted to fit into the entrance to chamber 1 and having burner ports 16 extending therethrough, the ports being flared at their forward end. Intermediate the ports 16 the burner block is provided with ports extending therethrough in a direction substantially parallel to the axis of the respective burner ports and adapted to receive make gas injection tubes 17 of refractory material and to permit tubes 17 to be moved backwards or forwards through the port as subsequently described. Tubes 17, as shown, project a substantial distance to the rear of the burner block, extending through openings in metal plate 18 into the wind box 19. Tubes 20 of metal, flared at their rearward end, also extend through openings in plate 18, to which they are securely fastened as by welding, and are positioned and supported by the plate. The forward ends of the tubes 20 project into the blast ports 16 and advantageously are cemented to the ports to secure a tight fit. Centrally positioned at the entrance of each of the tubes 20 is a fuel nozzle 21 connected by tube 22 to the fuel gas manifold 23 to which fuel gas is supplied under pressure through pipe 24 from any convenient source.

The make gas injection tubes 17 are connected with the make gas manifolds 25 by means of metal tubes 25A which are secured to the rearward ends of the refractory tubes 17, as by cementing. Make gas is supplied to manifolds 25 from a suitable source, not shown, through tubes 26.

Air for admixing with the fuel gas to form the combustible mixture is supplied under pressure to the wind box 19 from any convenient source through air duct 27 and air chamber 27a. The side walls 28 of the wind box are of impervious sheet metal and are secured to flange 29 by conventional means, for instance, by welding or by riveting. The flange 29 is in turn fastened to plate 18, advantageously by bolting or the like, so as to provide ready access to the interior of the wind box and the elements therein, for purposes of cleaning, repair, and replacement. By like means, the flange 29 and plates 18 are removably fastened to the rearward walls 30 of the respective reaction chambers.

So as to insure uniform distribution of the incoming air to the respective burner ports, the air entering the wind box is, with advantage, caused to pass through perforations of the perforated metal plate 31, held in position between the flanges 32 and 33 secured to the air chamber 27a and the walls 28 of the wind box, respectively, and by means of which the two are joined as by bolts. In lieu of the perforated plate 31, or as a supplement thereto, even distribution of air to the respective burner ports may be assured by longitudinally extending the wind box as indicated in Figs. 3 and 6 of the drawings.

Also, as shown more clearly in Figs. 3 and 6, the air chamber 27a is with advantage enlarged to the transverse dimensions of the wind box and the rear end of this chamber 27a sealed by a removable plate 34 held in place as by flanges 35. The plate 34 is provided with openings adapted to permit the passage therethrough of fuel gas conduit 24 and make gas conduits 26.

As shown particularly in Fig. 4 of the drawings, the fuel gas manifold 23 is supported by brackets 36 and is adapted to be moved longitudinally so as to adjust the position of nozzles 21 with respect to the entrance ends of tube 20 without interrupting operation. The make gas manifolds 25 are supported by the conduits 26 and the plates 31 and 34, and are likewise adapted to longitudinal movement whereby the position of the exit end of tubes 17 may be adjusted with respect to the face of the burner block without stopping the operation of the furnace.

As appears more clearly from Fig. 5 of the drawings, each of the make gas injection tubes 17 is flanked on all sides by blast ports 16.

In the operation of this apparatus, in accordance with the process described in our said copending application, the fuel gas under pressure of about 10 lbs. per square inch is supplied through line 24, header 23 and connections 22 to the nozzles 21, and is jetted thereby into and through the burner port 16. Air for combustion is supplied under pressure through conduit 27 and air chamber 27a to the wind box 19 and passes at high velocity through the burner port 16. In passing through the burner ports, the air and fuel gas are intimately and uniformly admixed. The air and fuel gas thus supplied are so proportioned that the combustible mixture issuing from the burner ports contains oxygen and fuel gas in proportions to produce a so-called oxidizing, neutral or reducing blast flame, as may be desired.

The combustible mixture is ignited at the exit of the burner ports to form a violently turbulent blast flame. In order to produce a blast flame of the violent turbulence required, it is necessary that the combustible mixture be blasted through and from the burner ports at an unusually high velocity.

The throat of the blast ports should not exceed about 2 inches to 2½ inches in diameter. Diameters greater than 2½ inches have generally been found undesirable. Burner ports as small as one-half inch in diameter may be used. Burner blocks, so designed, as to create a zone of eddy currents at the periphery of each blast port exit appear to assist in maintaining ignition of the blast gases at the port exit, to permit maximum blast velocities and to assist in maintaining maximum rate of combustion and uniform flame development across the transverse section of the furnace. A substantial area of relatively flat surface at the burner block face appears to assist in establishing and maintaining such a zone of eddy currents.

The make gas is supplied through lines 26, headers 25 and connections 25a to the make gas injection tubes 17, and is injected at high velocity, as previously described, into the violently turbulent blast flame gases. The structure of the make gas streams appears to persist for a brief period and then the make gas rapidly becomes intimately admixed with the blast flame gases. The mixture continues at high velocity and high turbulence through the chamber 1 and from thence passes into the blending chamber 3, wherein the gaseous mixtures from the respective reaction chambers become admixed. Advantageously, the transverse sectional area of blending chamber 3 is greater than the summation of the transverse areas of the chamber 1, so as to provide additional time factor at the elevated temperature. The cost of construction may be materially reduced by providing an enlarged blending chamber of the type shown, but its use is not an essential feature of the present invention.

It is important that the gaseous mixture resulting from the injection of the make gas into the blast flame gases be maintained in a state of violent turbulence for an extended period of time. During this period of violent turbulence, the admixture must be maintained at a temperature at which active decomposition of make gas will occur. Such a temperature should also be maintained for a period of time following the necessary period of violent turbulence but during this subsequent period it is not essential that the violent turbulent condition be maintained. Accordingly, it is permissible to reduce the velocity of the gaseous mixture and suspended carbon by passing it through a, so-called, blending chamber of increased transverse sectional area to provide the necessary time factor at the required temperature.

Leaving the blending chamber, the gaseous mixture passes through the flume 4 in which there is some loss of heat from the mixture through the substantially uninsulated walls thereof, and in which the reaction-time factor may be suddenly terminated by cooling the mixture to below the reaction temperature, as by spraying with water. Advantageously, the flume is substantially smaller in transverse sectional area than the blending chamber so as to provide more accurate control of the duration of the period during which the gas and suspended carbon mixture is maintained at a reaction temperature. By means of water sprays spaced along the flume, the time factor may be adjusted by the selective use of a water spray so positioned in the flume as to provide the optimum time factor before contact of the hot mixture with the water spray.

One or more water sprays in flume 4 may be used as required to accommodate the apparatus to varying load capacities. Only three water sprays are shown in the drawings. However, it will be understood that additional sprays spaced at a point intermediate those shown may be used to effect more accurate control of the time factor.

As previously noted, the hot mixture passes from the flume into a pre-cooler indicated at 5, which may be of any conventional design, and from thence passes to a cooling and collecting system, which may also be of any conventional design.

The point of injection of the make gas into the flame gases may be readily controlled and regulated in the apparatus shown by adjusting the position of the exit and of the tube 17 with respect to the face of the burner block 15. In normal operation, it is usually desirable that tubes 17 project at least about 1 inch but not exceeding 12 inches beyond the face of the burner block. However, the exit ends of tube 17 may, with advantage, under some operating conditions, be positioned flush with the face of the burner block, or even slightly recessed.

The make gas injection tubes are preferably composed of a heat conducting refractory, so that the incoming make gas may be preheated to a point at which pyrolysis is initiated by radiant energy from the reaction chamber prior to injection into the blast flame gases. The amount of preheating may, in general, be increased by increasing the projection of the make gas tubes into the reaction chamber. However, extension of these tubes beyond about 12 inches is usually undesirable.

The point of make gas injection should be completely surrounded by blast flames. This is accomplished in the apparatus illustrated by surrounding the tubes 17 by blast flame ports 16, so that the entire assembly forms a uniform pattern.

One feature of such a balanced distribution is that through this means, wide variation in load is possible without necessitating substantial readjustment of other operating conditions, since a change in load involves a direct change in velocities and thus the rapidity of uniform distribution of the make gas in the blast flame gases is substantially unchanged. Thus, this method of make gas as injection has, in some instances, a definite advantage over the injection of the make gas into the blast flame at a substantial angle from the direction of flow of the blast gases.

The composition and structure of the furnace lining should be such as will withstand temperatures of the order of 2900° F. or higher under oxidizing conditions, though temperatures higher than about 2500–2600° F. are not generally encountered in operations of the type described.

In the particular apparatus shown in the drawings, each of the three reaction chambers is about 14 feet 3 inches in length, measured from the extreme front end of the chamber to the point where the enlargement of the chamber begins, and are 17 inches wide and 3 feet 2.5 inches high. From the front end of the central reaction chamber to the entrance of the flume is approximately 22 feet 8 inches and the length of the straight, vertical outside walls of the unit is approximately 17 feet 9 inches. The height of the blending chamber is 3 feet 11.5 inches. The flume is 3 feet 6 inches inside diameter and about 25 feet long. Each burner block is provided with 8 make gas injection tubes of 1 inch inside diameter and 42 burner ports, the throat of each port being 1⅝ inches in diameter.

A greater or lesser number of make gas injection tubes and of burner ports may be used, so long as the make gas tubes are flanked on all sides by blast ports. By this arrangement of the make gas injection tubes each separate stream of make gas is initially treated individually. Further, by this arrangement, the surrounding walls of the reaction chamber are protected from contact with concentrated make gas, which contact would result in the formation and deposition of coke thereon.

As previously noted, the relative proportions and arrangement of the various elements of the apparatus are subject to considerable variation. For example, a second apparatus embodying the principal of the present invention, which has been used to advantage, comprised a single cylindrical reaction chamber having an inside diameter of 9 inches and constructed of two 4½ inch layers of fire brick, and two 4½ inch layers of insulating brick. The total length of the unit, measured from the entrance end of the reaction chamber to the water spray cooler was 24 feet. The burner block was circular and was provided with 8 blast ports of 1 inch diameter throats uniformly spaced about a centrally proportioned 1 inch inside diameter Carbofrax make gas injection tube passing through the center of the burner block and terminating at a point slightly beyond the face thereof.

Satisfactory results have also been obtained in furnaces comprising a single rectangular reaction chamber 11 inches wide, 24 inches high, and varying from 16 feet to 24 feet in length from which the carbon black suspension passed directly to a chamber such as the flume shown in the drawings.

The length of the reaction chamber will be governed primarily by the velocity at which the gases are to be passed therethrough, and should be sufficient to provide the necessary time factor. We have found, generally, that the unobstructed reaction chamber should extend at least 5 feet, and preferably not less than about 7 feet, beyond the point of the make gas injection. Where a single reaction chamber is used the blending chamber may, with advantage, be omitted and the reaction chamber elongated to provide the necessary time factor for the entire operation. In apparatus, such as shown in the drawings, reaction chambers of about 14 feet in length have been used with advantage. Particularly where enlarged blending chambers are not employed, the length of the reaction chamber may, with advantage, be as great as about 20 to 25 feet.

Where blending chambers are employed, the enlargement in cross-sectional area should not be so great as to permit the establishment of large eddies within the chamber which might cause a retention of a portion of the carbon in the chamber for a period of time so prolonged as to detrimentally affect the products. Optimum transverse dimensions of the blending chambers, when employed, will depend upon the rate at which the gaseous mixture is to be supplied thereto, and the length will depend upon the period of time required for the completion of the reaction, of which the velocity of the gases passing through the zone is an important factor.

In order to provide adequate velocity for the required turbulence in the confined zone, herein designated reaction chamber, and, at the same time, provide the required reaction time at high temperature, it has been found desirable to maintain the ratio of total volume of the reaction zone and blending chamber, in cubic feet, to cross sectional area of reaction chamber or chambers, expressed as square feet, in the range of 20 to 80 cubic feet per square foot. Thus, a ratio of about 35:1 has been used in apparatus such as shown in the drawings. Particularly desirable results are obtained in commercial units in which this ratio is within the range of 30:1 to 70:1.

Burner heads adapted to deliver the combustible mixture to the reaction chamber at a blast port throat velocity in the range of 35 to 135 feet per second, based on volume measured at 60° F. and an absolute pressure of 30 inches of mercury, have been found desirable in large scale units. Burners adapted to throat velocities of about 85 feet per second have been found particularly satisfactory.

Satisfactory operation has been obtained in units having a total burner port throat area of 3% to 28% of the transverse sectional area of the reaction chamber. The combustible mixture may be supplied to the burner block premixed or may be admixed at the burner. Burner port areas of about 12½% have been found especially advantageous with nozzle mixing burners, and areas of about 7% to 10% have been found particularly advantageous where the gas and air have been premixed before passing to the burner. In large units, burner port areas of 7% to 25% of the tranverse sectional area of the reaction chamber is generally recommended.

The reaction chamber and also the blending chamber, when used, should be thoroughly heat insulated so as to avoid any substantial loss of heat by the gas stream during the reaction.

Further, the ports in the burner block, through which the make gas injection tubes 17 project, should be sufficiently greater in diameter than the outer diameter of the tube 17 to permit lateral adjustment of the tubes. The fit between the port and the tube should be substantially gas-tight, and advantageously conventional packing, adapted to withstand the elevated temperature, may be employed.

The total transverse sectional area of the make gas injection tubes is subject to considerable variation, depending primarily upon the number of tubes used and the capacity of the apparatus. We have found it desirable to use make gas injection tubes of about 1 inch inside diameter. Make gas injection tubes of ½ to 2 inches I. D. may be used with advantage.

It appears that where the make gas is injected into the blast flame gases in accordance with the operation of our present apparatus and under the operating conditions herein described, the stream or streams of make gas remain in contact with the blast flame gases substantially undispersed therein for a brief interval sufficient to effect partial pyrolysis of the make gas in a relatively concentrated form, i. e. without substantial dilution of the make gas with the flame gases, but immediately following this brief interval, during which partial pyrolysis is effected, the make gas becomes intimately dispersed in the blast flame gases before the reaction has been permitted to proceed to completion. The apparatus has been found particularly desirable in the production of carbon black by the decomposition of natural gas enriched by the addition of higher hydrocarbons.

We claim:

1. Apparatus particularly adapted to the production of carbon black which comprises an elongated, unobstructed chamber adapted to withstand high temperatures and of substantially uniform cross-section, a burner block positioned in one end of the chamber, a wind-box enclosing the outer end of the burner block, a tubular member extending through said burner block and opening into the elongated chamber in a direction substantially parallel to the longitudinal axis of the chamber, a plurality of burner ports extending through said burner block, symmetrically positioned about said tubular member and opening into the elongated chamber in a direction substantially parallel to the longitudinal axis of the chamber, a fuel gas nozzle positioned in the wind-box at the outer end of each burner port, spaced from the port and adapted to inject a fuel gas through the port, conduit means for supplying a gaseous medium to the fuel gas nozzles, conduit means for supplying air to the wind-box and separate conduit means for supplying a gaseous medium to the tubular member.

2. Apparatus particularly adapted to the production of carbon black which comprises an elongated, unobstructed chamber adapted to withstand high temperatures and of substantially uniform cross-section, a burner block positioned in one end of the chamber, a wind-box enclosing the outer end of the burner block, a plurality of tubular members extending through said burner block and opening into the chamber in a direction substantially parallel to the longitudinal axis of the chamber and uniformly spaced over the area of the face of the burner block, a plurality of burner ports extending through said burner block, symmetrically positioned about each said tubular member and opening into the elongated chamber in a direction substantially parallel to the longitudinal axis of the chamber, a fuel gas nozzle positioned in the wind-box at the outer end of each burner port, spaced from the port and adapted to inject a fuel gas through the port, conduit means for supplying a gaseous medium to the fuel gas nozzles, conduit means for supplying air to the wind-box and separate conduit means for supplying a gaseous medium to the tubular members.

3. Apparatus particularly adapted to the production of carbon black which comprises an elongated, unobstructed chamber adapted to withstand high temperatures and of substantially uniform cross-section, a burner block positioned in one end of the chamber, a wind-box enclosing the outer end of the burner block, a plurality of burner ports extending through said burner block opening into the elongated chamber in a direction substantially parallel to the longitudinal axis of the chamber, and arranged in a uniform pattern across the face of the burner block, a fuel gas nozzle positioned in the wind-box at the outer end of each burner port, spaced from the burner port and adapted to inject a fuel gas through the burner port, a plurality of tubular members extending through said burner block, opening into the chamber in a direction substantially parallel to the longitudinal axis of the chamber, arranged in a uniform pattern across the face of the burner block so that each tubular member is surrounded by a uniform pattern of burner ports, conduit means for supplying a gaseous medium to the fuel gas nozzles, conduit means for supplying air to the wind-box and separate conduit means for supplying a gaseous medium to the tubular members.

4. Apparatus particularly adapted to the production of carbon black which comprises an elongated, unobstructed chamber adapted to withstand high temperatures and of substantially uniform cross-section, a burner block positioned in one end of the chamber, a wind-box enclosing the outer end of the burner block, a tubular member extending through said burner block and opening into the elongated chamber in a direction substantially parallel to the longitudinal axis of the chamber, a plurality of burner ports extending through said burner block, symmetrically positioned about said tubular member and opening into the elongated chamber in a direction substantially parallel to the longitudinal axis of the chamber, a fuel gas nozzle positioned in the wind-box at the outer end of each burner port, spaced from the port and adapted to inject a fuel gas through the port, conduit means for supplying a gaseous medium to the fuel gas nozzles, conduit means for supplying air to the wind-box and separate conduit means for supplying a gaseous medium to the tubular member, said tubular member projecting past the face of the burner block into the end of the elongated chamber.

5. Apparatus particularly adapted to the production of carbon black which comprises an elongated, unobstructed chamber adapted to withstand high temperatures and of substantially uniform cross-section, a burner block positioned in one end of the chamber, a wind-box enclosing the outer end of the burner block, a tubular member extending through said burner block and opening into the elongated chamber in a direction substantially parallel to the longitudinal axis of the chamber, a plurality of burner ports extending through said burner block, symmetrically positioned about said tubular member and opening into the elongated chamber in a direction substantially parallel to the longitudinal axis of the chamber, a fuel gas nozzle positioned in the wind-box at the outer end of each burner port, spaced from the port and adapted to inject a fuel gas through the port, conduit means for supplying a gaseous medium to the fuel gas nozzles, conduit means for supplying air to the wind-box and separate conduit means for supplying a gaseous medium to the tubular member, said tubular member projecting past the face of the burner block into the end of the elongated chamber and being adapted to be moved longitudinally through said burner block.

6. Apparatus particularly adapted to the production of carbon black which comprises an elongated, unobstructed chamber adapted to withstand high temperatures and of substantial uniform cross-section, a burner block positioned in one end of the chamber, a wind-box enclosing the outer end of the burner block, a plurality of tubular members extending through said burner block and opening into the chamber in a direction substantially parallel to the longitudinal axis of the chamber and uniformly spaced over the area of the face of the burner block, a plurality of burner ports extending through said burner block, symmetrically positioned about each said tubular member and opening into the elongated chamber in a direction substantially parallel to the longitudinal axis of the chamber, a fuel gas nozzle positioned in the wind-box at the outer end of each burner port, spaced from the port and adapted to inject a fuel gas through the port, conduit means for supplying a gaseous medium to the fuel gas nozzles, conduit means for supplying air to the wind-box, separate conduit means for supplying a gaseous medium to the tubular members, the diameter of the throat of the burner ports being not less than ½ inch and not greater than 2½ inches, the total transverse area of the burner ports being within the range of 3% to 28% the transverse area of the chamber and the inside diameter of the make gas injection tubes being not less than ½ inch, nor greater than 2 inches.

WILLIAM B. WIEGAND.
HAROLD A. BRAENDLE.

REFERENCES CITED

The following references are of record in the file of this patent:

UNITED STATES PATENTS

| Number | Name | Date |
|---|---|---|
| 1,401,737 | Rumbarger | Dec. 27, 1921 |
| 1,911,177 | Beck | May 30, 1933 |
| 1,950,046 | Cone | Mar. 6, 1934 |
| 2,003,943 | Klees | June 4, 1935 |
| 2,039,981 | Rembert | May 5, 1936 |
| 2,140,316 | Furlong | Dec. 13, 1938 |
| 2,163,630 | Reed | June 27, 1939 |
| 2,238,576 | Heller et al. | Apr. 15, 1941 |
| 2,368,828 | Hanson et al. | Feb. 16, 1945 |